Patented Sept. 18, 1928.

1,684,640

UNITED STATES PATENT OFFICE.

OTTO SCHMIDT, KARL SEYDEL, AND ALBERT FELLER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PURIFYING ORGANIC COMPOUNDS CONTAINING OXYGEN.

No Drawing. Application filed June 9, 1926, Serial No. 114,830, and in Germany June 18, 1925.

In the catalytic hydrogenation of oxids of carbon, mixtures of oxygen-containing organic compounds of a higher order than methanol, which oily products consists chiefly of saturated alcohols with 4 or more carbon atoms besides unsaturated alcohols, aldehydes, ketones, esters and other compounds, are obtained under certain conditions. The said oily products are often colored and have an unpleasant smell.

We have now found that the said products are rapidly and in a simple manner converted into colorless oils which do not grow dark and which smell only very slightly, by subjecting them to catalytic hydrogenation in the vapor phase. The reaction product consists substantially of alcohols which can be separated for example by fractional distillation much more simply than is possible with the crude mixture containing aldehydes and ketones, part of which compounds form very difficultly separable fractions. Hydrogenation may be applied not only to the crude product as it is directly obtained, but also to fractions of such products, among which those boiling above 150° C. often contain the compounds causing darkening and unpleasant smell.

Preferably the hydrogenation is carried out at moderately elevated temperatures between about 100° and 180° C. Especially when treating oils boiling above 200° C. it is advantageous to work at temperatures below the boiling point of the oil, as under these conditions purification is effected especially simply.

The catlysts to be used in the hydrogenation are those usually employed for this purpose, for example nickel, cobalt, copper, platinum alone or in mixtures, with or without a support or activating admixture or both.

The following examples will further illustrate how our invention may be carried out in practice, but the invention is not limited to these examples. The parts are by weight, unless otherwise stated.

Example 1.

A contact mass is prepared by making 100 parts of granulated pumice stone, 9 parts of nickel carbonate and 1 part of copper carbonate into a paste by means of 9 parts of sodium silicate and water and reducing the mixture at 300° to 320° C. A mixture of the vapors of an oily product obtained by the catalytic hydrogenation of oxids of carbon and boiling between about 190° and 250° C., with hydrogen, which mixture consists of about 2 parts, by volume, of organic vapors and 98 parts, by volume, of hydrogen, is passed at about 150° to 170° C. over the said contact mass. On cooling the gases leaving the reaction vessel, a colorless oil smelling only slightly similar to amyl alcohol is obtained.

The oils to be hydrogenated may also be subjected to a preliminary purification for example by treating them for about an hour at 90° C. with about 10 per cent their weight of granular silica and filtering or by treating them with caustic soda solution.

Example 2.

A mixture of hydrogen with vapors of an oily products obtained by the catalytic hydrogenation of oxids of carbon and boiling between 80° and 250° C. is passed at about 130° to 140° C. over a contact mass consisting of 100 parts of granulated pumice stone, 9 parts of nickel carbonate and 3.6 parts of aluminium hydroxid, which were made into a paste by means of 9 parts of sodium silicate and water and reduced at about 300° to 320° C. The speed of the gas and the degree of dilution of the vapors is controlled so as to avoid condensation of components of higher boiling point in the reaction vessel. A colorless oil smelling pleasantly of alcohols is obtained.

Instead of aluminium hydroxid the contact mass may also contain aluminium salts, for instance aluminium phosphate; other additions, such as thoria, tungsten oxid and the like are also suitable.

We claim:

1. The process of purifying oxygen-containing organic compounds of a higher order than methanol obtainable by the catalytic hydrogenation of oxids of carbon which consists in treating the said products in the vapor phase with hydrogen at a temperature of at least 50° C. but below that at which decomposition of the organic compounds under treatment would set in in the presence of a hydrogenating catalyst.

2. The process of purifying oxygen-containing organic compounds of a higher order than methanol obtainable by the catalytic hydrogenation of oxids of carbon which consists in treating the said products in the vapor phase with hydrogen at an elevated temperature but below their boiling point in the presence of a hydrogenating catalyst.

3. The process of purifying oxygen-containing organic compounds of a higher order than methanol obtainable by the catalytic hydrogenation of oxids of carbon which consists in treating the said products in the vapor phase after a preliminary purification, with hydrogen at a temperature of at least 50° C. but below that at which decomposition of the organic compounds under treatment would set in in the presence of a hydrogenating catalyst.

In testimony whereof we have hereunto set our hands.

OTTO SCHMIDT.
KARL SEYDEL.
ALBERT FELLER.